(12) United States Patent
Ezaki et al.

(10) Patent No.: US 7,299,646 B2
(45) Date of Patent: Nov. 27, 2007

(54) EXPANSION VALVE HAVING SOLENOID RELIEF VALVE

(75) Inventors: Hiroyuki Ezaki, Tokyo (JP); Kazuhiko Watanabe, Tokyo (JP); Eiji Fukuda, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 300 days.

(21) Appl. No.: 10/973,247

(22) Filed: Oct. 27, 2004

(65) Prior Publication Data

US 2005/0097920 A1 May 12, 2005

(30) Foreign Application Priority Data

Nov. 6, 2003 (JP) .............................. 2003-376444

(51) Int. Cl.
*F25B 41/00* (2006.01)

(52) U.S. Cl. ..................... 62/210; 62/527; 236/92 B

(58) Field of Classification Search ................. 62/50.4, 62/198, 197, 204, 210, 222, 527; 137/511; 251/30.02, 129.15, 129.01, 129.17, 30.01; 236/92 B
See application file for complete search history.

(56) References Cited

U.S. PATENT DOCUMENTS 4,073,464 A * 2/1978 Hansen et al. ................ 251/26
5,588,590 A * 12/1996 Sakakibara et al. ....... 236/92 B
6,085,531 A 7/2000 Numoto et al.
6,892,953 B2 * 5/2005 Matsuda et al. .......... 236/92 B

FOREIGN PATENT DOCUMENTS

CN 1125255 C 10/2003
JP 11-173705 A 7/1999

OTHER PUBLICATIONS

Mahumoud Ghodbane, Ph. D. et al., "R-152a Mobile A/C with directed Relief Safety System," SAE Automotive Alternate Refrigeration Systems, 23 pages (Jul. 15-17, 2003).
Chinese IPO Office Action with relevant translation for App. No. 2004100884935, Fujikoki Corporation, Mar. 2, 2007 (12 pages).

* cited by examiner

*Primary Examiner*—Mohammad M. Ali
(74) *Attorney, Agent, or Firm*—Rader, Fishman & Grauer PLLC

(57) ABSTRACT

An expansion valve has a solenoid relief valve equipped in an air conditioner for decompressing and expands a refrigerant and supplies the same to an evaporator. A high-pressure refrigerant from a compressor enters a valve chamber. The refrigerant traveling towards the evaporator flows through a first passage. The refrigerant returning from the evaporator toward the compressor flows through a second passage. A valve seat is disposed between the valve chamber and the first passage. A valve body has a refrigerant chamber disposed in parallel to the valve seat and communicates the valve chamber and the first passage. A valve device is capable of coming into contact with and separating from the valve seat. A power element drives the valve device. A solenoid relief valve is disposed between the refrigerant chamber and the first passage.

4 Claims, 2 Drawing Sheets

EXPANSION VALVE HAVING SOLENOID RELIEF VALVE

The present application is based on and claims priority of Japanese patent application No. 2003-376444 filed on Nov. 6, 2003, the entire contents of which are hereby incorporated by reference.

BACKGROUND OF THE INVENTION

1. Field of the Invention

The present invention relates to an expansion valve equipped for example to an air conditioner of a vehicle, for controlling the flow rate of a refrigerant sent toward an evaporator, the expansion valve having a mechanism for discharging the refrigerant to the atmosphere in case of an emergency.

2. Description of the Related Art

Recently, a refrigerant used in a refrigeration cycle is required to have a property applying small load on the environment. However, some types of refrigerants are harmful to the human body or are inflammable.

In a refrigeration cycle using such types of refrigerant, in case of an emergency such as when the refrigerant is filled in a chamber due to gas leak or when gas leak occurs by collision of the vehicle, it becomes necessary to discharge the refrigerant rapidly into the atmosphere.

Non-patent document 1; Jul. 15-17, 2003 SAE Automotive Alternate Refrigeration Systems, "R-152a Mobile A/C with Directed Relief Safety System", Mahmoud Ghodbane, Ph. D., James A. Baker, William R. Hill and Stephen O. Andersen, Ph. D.; discloses a refrigeration cycle for discharging the refrigerant to the atmosphere at times of emergency.

FIG. 2 shows an example of a refrigeration cycle circuit according to the above-mentioned prior art.

The prior art refrigeration cycle illustrated in FIG. 2 is formed of a compressor 1, a condenser 2, an expansion valve 3 and an evaporator 4 which are connected in the named order via a piping 7, wherein a first relief valve 5 is connected to a pipe branched out from the piping between the compressor 1 and the condenser 2, and a second relief valve 6 is connected to a pipe branched out from the piping between the expansion valve 3 and the evaporator 4.

As shown in FIG. 2, relief valves are disposed at two locations in the circuit, one in a high-pressure circuit connecting the compressor and the expansion valve, and one in a low-pressure circuit connecting the expansion valve, the evaporator and the compressor. In case of an emergency, signals are received from a refrigerant detection sensor for detecting refrigerant leak or from an acceleration sensor that operates during collision, based on which the relief valves are opened and refrigerant is discharged.

The reason why two relief valves are equipped in the prior art refrigeration cycle is because the high-pressure circuit and the low-pressure circuit are cut off when the air conditioner is stopped, since the valve of the expansion valve is closed. Therefore, if only one relief valve is disposed in the high-pressure refrigerant circuit, only the refrigerant in the high-pressure circuit can be discharged but the refrigerant in the low-pressure circuit cannot be discharged.

If one relief valve is disposed in the low-pressure circuit, the refrigerant in the low-pressure circuit can be discharged, and at that time, the discharge of the low-pressure refrigerant causes the pressure in the low-pressure circuit to drop, causing the valve of the expansion valve to open and the high-pressure refrigerant to flow into the low-pressure circuit. This causes the pressure in the low-pressure circuit to rise and the valve of the expansion valve to close, then the refrigerant in the low-pressure circuit is discharged through the relief valve, and when the pressure in the low-pressure circuit drops, the valve of the expansion valve opens again. This repeated phenomenon causes the refrigerant to be discharged gradually, or in other words, slowly, taking a long time to discharge the refrigerant.

Therefore, the refrigerant is discharged from both the high-pressure circuit and the low-pressure circuit, as illustrated in the refrigeration cycle of FIG. 2.

SUMMARY OF THE INVENTION

As mentioned above, according to the prior art refrigeration cycle, it was necessary to dispose two relief valves and piping connections for the valves to the cycle, which caused the cost of the refrigeration cycle to be increased and complicated assembly operations.

The present invention aims at solving the above-mentioned problems of cost and assembly operations.

In other words, the present invention provides an assembly in which one relief valve is attached to the side wall of an expansion valve to allow the refrigerant in both the high-pressure and low-pressure circuits to be discharged simultaneously via the one relief valve. The assembly operation of the valve is facilitated since it can be attached to conventional expansion valves.

The expansion valve according to the present invention comprises, as basic components, a valve chamber into which a high-pressure refrigerant from a compressor enters; a first passage through which flows the refrigerant traveling toward the evaporator; a second passage through which flows the refrigerant returning from the evaporator toward the compressor; a valve seat disposed between the valve chamber and the first passage; a valve body having a refrigerant chamber disposed in parallel to the valve seat and communicating the valve chamber and the first passage; a valve means capable of coming into contact with and separating from the valve seat; a power element which is a driving mechanism for the valve means; and a solenoid relief valve disposed between the refrigerant chamber and the first passage.

Further, the solenoid relief valve comprises a relief valve body having a relief valve chamber; a relief valve means inserted to the relief valve chamber in a slidable manner for opening and closing a relief valve seat; a pilot valve disposed between the relief valve chamber and a passage opening to an atmosphere; a plunger for opening and closing the pilot valve; and a magnet coil for operating the plunger.

Moreover, the relief valve means has a cross-sectional shape that allows the high-pressure refrigerant in the refrigeration chamber to be introduced into the relief valve chamber, and the pilot valve comprises a pilot valve chamber communicated with the relief valve chamber; a pilot valve seat disposed between the pilot valve chamber and the passage opening to the atmosphere; a plunger having a pilot valve means for opening and closing the pilot valve seat; a pipe member having the plunger inserted thereto; an attractor fixed to an end of the pipe member; a compression coil spring disposed between the attractor and the plunger; and a magnet coil attached to an outer circumference of the pipe member.

According to the present invention, by attaching a single relief valve to the expansion valve which does not require a special connection piping, a means for discharging the refrigerant in the refrigeration cycle rapidly can be realized at a low cost and without having to substantially change the arrangement of the prior art expansion valve.

DETAILED DESCRIPTION OF THE PREFERRED EMBODIMENTS

The preferred embodiments of the present invention will now be described.

Figure 1:
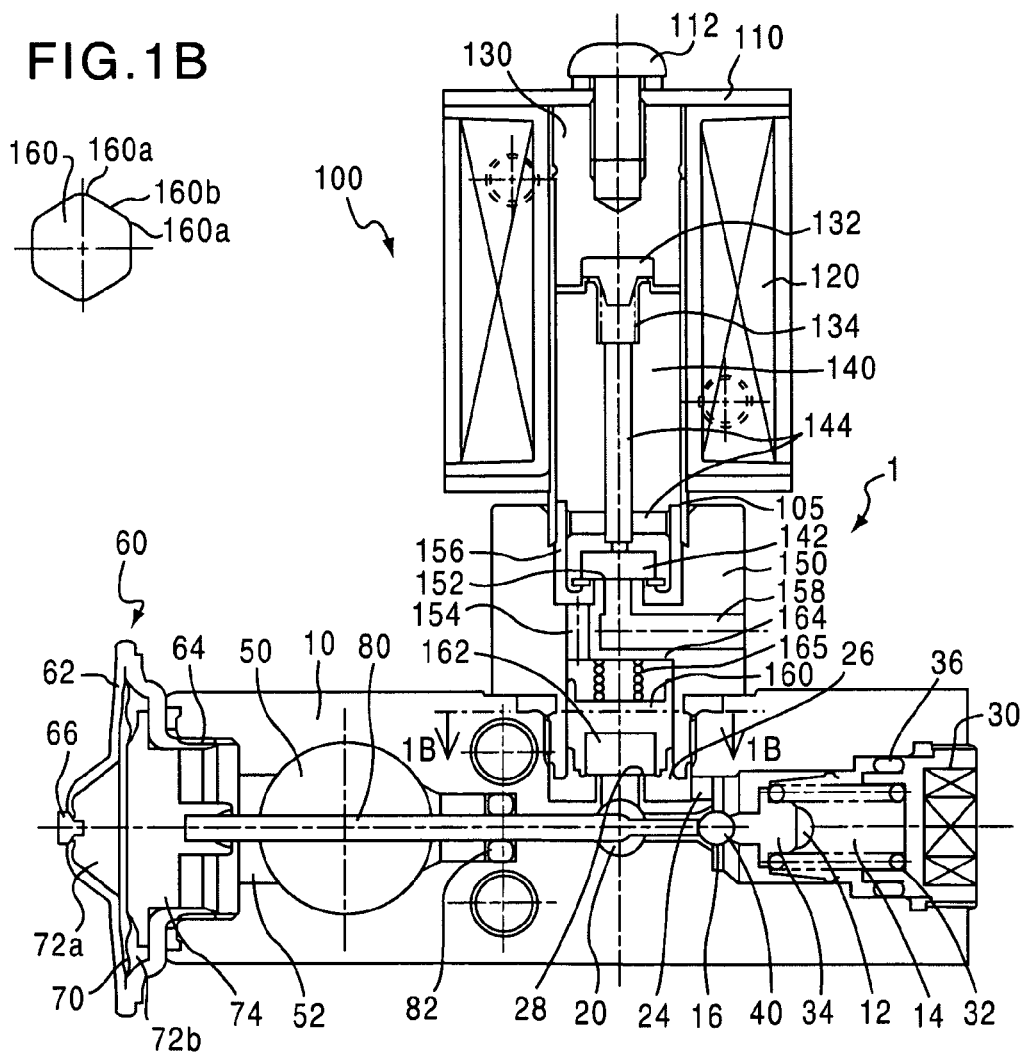
FIG. 1, consisting of FIG. 1A and FIG. 1B, is a cross-sectional view illustrating one preferred embodiment of the present invention.
Figure 2:
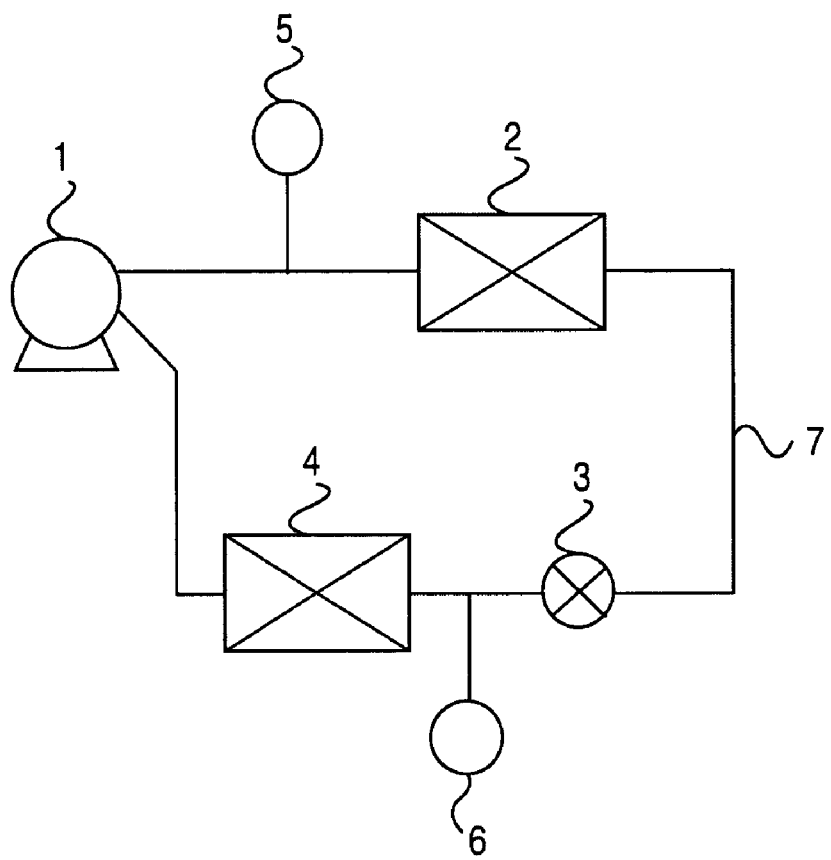
FIG. 2 is a drawing showing the structure of a prior art refrigeration cycle.

FIG. 1 is a cross-sectional view of the expansion valve according to the present invention.

The expansion valve, the entire body of which is denoted by reference number 1, has a valve body 10 which is substantially prismatic. At the lower area of the valve body 10 is formed an inlet 12 through which a liquid-phase refrigerant from a compressor in a refrigeration cycle is supplied, and the inlet 12 is communicated with a valve chamber 14. In the valve chamber 14, a ball-shaped valve means 40 is disposed facing a valve seat 16. The valve means 40 is supported by a spring 32 via a support member 34.

A nut member 30 is screwed onto an opening portion of the valve chamber 14 and seals the chamber. By tightening the nut member 30, the spring 32 is pre-compressed, and a seal member 36 is attached to the nut member 30 supporting the valve means 40 via the support member 34 with predetermined spring force to thereby seal the valve chamber 14.

The refrigerant in the valve chamber 14 travels through an opening portion between the valve means 40 and valve seat 16 and flows out into a first passage 20. The first passage 20 sends the refrigerant through an outlet toward an evaporator not shown.

The refrigerant returning from the evaporator passes through a second passage 50 formed to the valve body 10 and is recycled to a compressor not shown. The refrigerant in the second passage is sent through a gap 52 into a power element 60 which is a valve drive mechanism attached to an upper portion of the valve body 10.

The power element 60 has a body 62 attached to the valve body 10 via a screw portion 64. It further has a diaphragm 70 sandwiched by the body 62, which defines an upper chamber 72a and a lower chamber 72b. A working fluid is filled in the upper chamber 72a and sealed by a plug 66.

The diaphragm 70 is supported by a stopper 74. The stopper 74 is formed either integrally with or separately from a valve shaft 80. One end of the valve shaft 80 is in contact with the valve means 40. A seal member 82 is fit to the outer circumference of the valve shaft 80.

Since the expansion valve 1 is arranged as described above, the valve shaft 80 moves according to the operation position of the diaphragm 70 determined to correspond to the pressure and temperature of the refrigerant returning from the evaporator and flowing through the second passage 50, adjusting the gap formed between the valve means 40 and the valve seat 16.

When the thermal load of the evaporator is large, the gap between the valve means 40 and the valve seat 16 is widened, causing a large amount of refrigerant to be supplied to the evaporator. On the other hand, if the thermal load is small, the flow rate of the refrigerant is reduced.

A solenoid relief valve, the entire body of which is denoted by reference number 100, has a relief valve body 150 attached to the side wall of the valve body 10 of the expansion valve. The relief valve body 150 is screwed onto and fixed to an inner screw portion disposed to an opening of a refrigerant chamber 26 formed to the side wall of the expansion valve body 10.

The expansion valve body 10 has a refrigerant passage 24 that communicates the valve chamber 14 into which high-pressure refrigerant is introduced and the refrigerant chamber 26. The refrigerant chamber 26 communicates via a relief valve seat 28 with a refrigerant passage 20 leading to an evaporator (not shown).

A relief valve chamber 164 is formed to the relief valve body 150, and a relief valve means 160 is inserted thereto in a slidable manner. The relief valve 160 has a valve member 162 made of Teflon (registered trademark) or elastic material such as rubber disposed at an end thereof, that comes into contact with a relief valve seat 28. The relief valve means 160 has a hexagonal cylinder-shaped cross-section for example, as shown in A-A cross-sectional view, wherein corner portions 160a are in contact with the inner circumference portion of the relief valve chamber 164 while flat portions 160b define gaps with the inner circumference portion of the relief valve chamber 164.

The high-pressure refrigerant introduced into the refrigerant chamber 26 of the expansion valve body 10 passes through the gaps mentioned above and flows into the relief valve chamber 164. The high-pressure refrigerant pushes the relief valve means 160, by which the valve member 162 is pressed against the relief valve seat 28 and closes the space between the refrigerant chamber 26 and the refrigerant passage 20 leading to the evaporator 26.

Moreover, a coil spring 165 is disposed in the relief valve chamber 164 for pressing the relief valve means 160 against the relief valve seat 28 and closing the valve when the refrigeration cycle is stopped.

An attractor 130 is inserted to a pipe member 105 attached to the upper portion of the relief valve body 150, and on the upper end of the attractor 130 is fixed a coil housing 110 through an attachment screw 112.

A magnet coil 120 is attached to the coil housing 110, which is connected via an electric circuit not shown to a control unit. A plunger 140 is slidably inserted to the interior of the pipe member 105. Between the relief valve body 150 and the plunger 140 is formed a pilot valve chamber 156. The high-pressure refrigerant of the relief valve chamber 164 is introduced via a passage 154 into the pilot valve chamber 156.

A pilot valve means 142 is attached to the end of the plunger 140 and comes into contact with a pilot valve seat 152. The attractor 130 supports a coil spring 134 via a support member 132, and the coil spring 134 regularly biases the plunger 140 toward the pilot valve seat 152. This spring force enables the pilot valve means 142 to shut the valve of the pilot valve seat 152. The high-pressure refrigerant in the pilot valve chamber 156 is introduced through a passage 144 formed to the plunger 140 to the back side of the pilot valve means 142, so as to more reliably close the valve of the pilot valve seat 152.

When electricity is supplied to the magnet coil 120, magnetic force is generated in the attractor 130, attracting the plunger 140 toward the attractor 130 resisting against the spring force of the coil spring 134. Thereby, the pilot valve means 142 at the end of the plunger 140 separates from the pilot valve seat 152 and opens the pilot valve.

The high-pressure refrigerant in the pilot valve chamber 156 is rapidly relieved through a passage 158 toward the atmosphere. By this operation, the pressure within the relief valve chamber 164 drops, and the valve member 162 of the relief valve means 160 is pushed up by the high-pressure refrigerant in the refrigerant chamber 26 and in the passage 20 leading to the evaporator and is separated from the relief valve seat 28, by which the valve is opened.

Moreover, even when the valve means 40 is shut, the low-pressure refrigerant flowing through the low-pressure circuit of the first passage 20 is relieved rapidly through the passage 158 toward the atmosphere.

By opening the relief valve, the entire refrigerant in the refrigeration cycle is rapidly discharged to the atmosphere.

The signal used for supplying electricity to the solenoid valve can be, for example, a signal from an acceleration sensor for detecting the occurrence of collision of a vehicle equipped with an air conditioner having the refrigeration cycle containing the present expansion valve, or a signal from a refrigerant sensor for detecting a leakage of the refrigerant from the refrigeration cycle. The acceleration sensor can be used commonly with a sensor for operating an air bag.

What is claimed is:

1. An expansion valve having a solenoid relief valve equipped in an air conditioner for decompressing and expanding a refrigerant and supplying the same to an evaporator, the expansion valve comprising:
   a valve chamber into which a high-pressure refrigerant from a compressor enters;
   a first passage through which flows the refrigerant traveling toward the evaporator;
   a second passage through which flows the refrigerant returning from the evaporator toward the compressor;
   a valve seat disposed between the valve chamber and the first passage;
   a valve body having a refrigerant chamber disposed in parallel to the valve seat and communicating the valve chamber and the first passage;
   a valve means capable of coming into contact with and separating from the valve seat;
   a power element which is a driving mechanism for the valve means; and
   a solenoid relief valve disposed between the refrigerant chamber and the first passage,
   wherein the solenoid relief valve moves between a refrigerant retaining state and a refrigerant discharging state such that, in the refrigerant retaining state, the refrigerant is retained in the refrigerant chamber and the first passage and, in the refrigerant discharging state, the refrigerant is discharged to the atmosphere in an emergency.

2. An expansion valve having a solenoid relief valve equipped in an air conditioner for decompressing and expanding a refrigerant and supplying the same to an evaporator, the expansion valve comprising:
   a valve chamber into which a high-pressure refrigerant from a compressor
   a first passage through which flows the refrigerant traveling toward the evaporator;
   a second passage through which flows the refrigerant returning from the evaporator toward the compressor;
   a valve seat disposed between the valve chamber and the first passage;
   a valve body having a refrigerant chamber disposed in parallel to the valve seat and communicating the valve chamber and the first passage;
   a valve means capable of coming into contact with and separating from the valve seat;
   a power element which is a driving mechanism for the valve means; and
   a solenoid relief valve disposed between the refrigerant chamber and the first passage,
   wherein the solenoid relief valve comprises:
   a relief valve body having a relief valve chamber;
   a relief valve means inserted to the relief valve chamber in a slidable manner for opening and closing a relief valve seat;
   a pilot valve disposed between the relief valve chamber and a passage opening to an atmosphere;
   a plunger for opening and closing the pilot valve; and
   a magnet coil for operating the plunger.

3. An expansion valve having a solenoid relief valve equipped in an air conditioner for decompressing and expanding a refrigerant and supplying the same to an evaporator, the expansion valve comprising:
   a valve chamber into which a high-pressure refrigerant from a compressor enters;
   a first passage through which flows the refrigerant traveling toward the evaporator;
   a second passage through which flows the refrigerant returning from the evaporator toward the compressor;
   a valve seat disposed between the valve chamber and the first passage;
   a valve body having a refrigerant chamber disposed in parallel to the valve seat and communicating the valve chamber and the first passage;
   a valve means capable of coming into contact with and separating from the valve seat;
   a power element which is a driving mechanism for the valve means; and
   a solenoid relief valve disposed between the refrigerant chamber and the first passage,
   wherein the solenoid relief valve comprises:
   a relief valve body having a relief valve chamber;
   a relief valve means inserted to the relief valve chamber in a slidable manner for opening and closing a relief valve seat;
   a pilot valve disposed between the relief valve chamber and a passage opening to an atmosphere;
   a plunger for opening and closing the pilot valve; and
   a magnet coil for operating the plunger, and
      wherein the relief valve means has a cross-sectional shape that allows the high-pressure refrigerant in the refrigeration chamber to be introduced into the relief valve chamber.

4. An expansion valve having a solenoid relief valve equipped in an air conditioner for decompressing and expanding a refrigerant and supplying the same to an evaporator, the expansion valve comprising:
   a valve chamber into which a high-pressure refrigerant from a compressor enters;
   a first passage through which flows the refrigerant traveling toward the evaporator;
   a second passage through which flows the refrigerant returning from the evaporator toward the compressor;
   a valve seat disposed between the valve chamber and the first passage;
   a valve body having a refrigerant chamber disposed in parallel to the valve seat and communicating the valve chamber and the first passage;
   a valve means capable of coming into contact with and separating from the valve seat;

a power element which is a driving mechanism for the valve means; and a solenoid relief valve disposed between the refrigerant chamber and the first passage, wherein the solenoid relief valve comprises:

a relief valve body having a relief valve chamber;

a relief valve means inserted to the relief valve chamber in a slidable manner for opening and closing a relief valve seat;

a pilot valve disposed between the relief valve chamber and a passage opening to an atmosphere;

a plunger for opening and closing the pilot valve; and a magnet coil for operating the plunger, and wherein the pilot valve comprises:

a pilot valve chamber communicated with the relief valve chamber;

a pilot valve seat disposed between the pilot valve chamber and the passage opening to the atmosphere;

a plunger having a pilot valve means for opening and closing the pilot valve seat;

a pipe member having the plunger inserted thereto;

an attractor fixed to an end of the pipe member;

a compression coil spring disposed between the attractor and the plunger; and a magnet coil attached to an outer circumference of the pipe member.

* * * * *